Oct. 21, 1947. E. C. SLOAN 2,429,431
TEXTILE CONE AND PROCESS OF MANUFACTURE
Filed June 19, 1941 3 Sheets-Sheet 1

Witness:
Chas. L. Hursh

INVENTOR.
BY Edward C. Sloan
Parkinson & Lane
Attys.

Oct. 21, 1947.  E. C. SLOAN  2,429,431
TEXTILE CONE AND PROCESS OF MANUFACTURE
Filed June 19, 1941   3 Sheets-Sheet 2
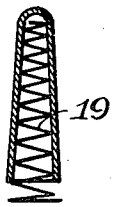
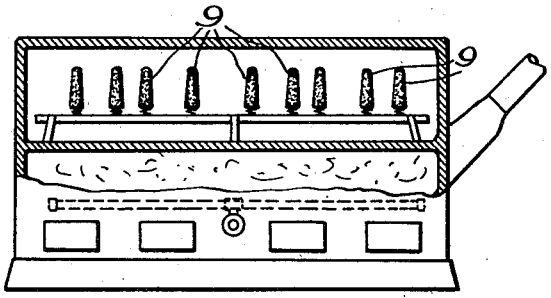
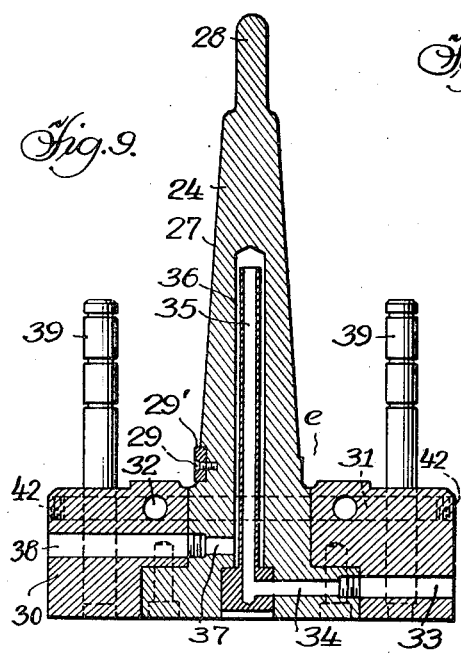
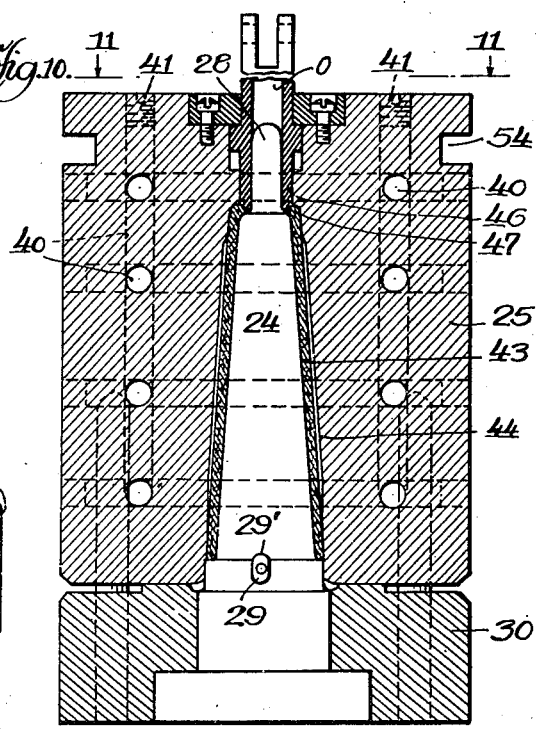
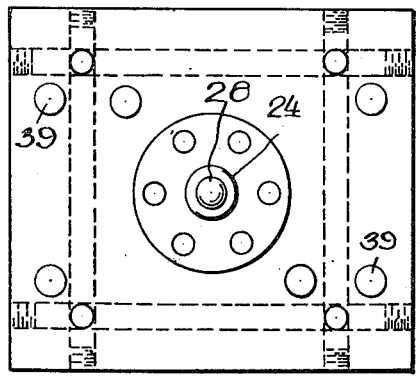
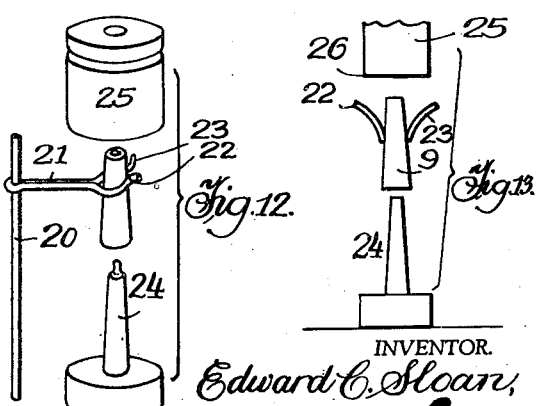
INVENTOR.
Edward C. Sloan,
By Parkinson & Lane
Attys

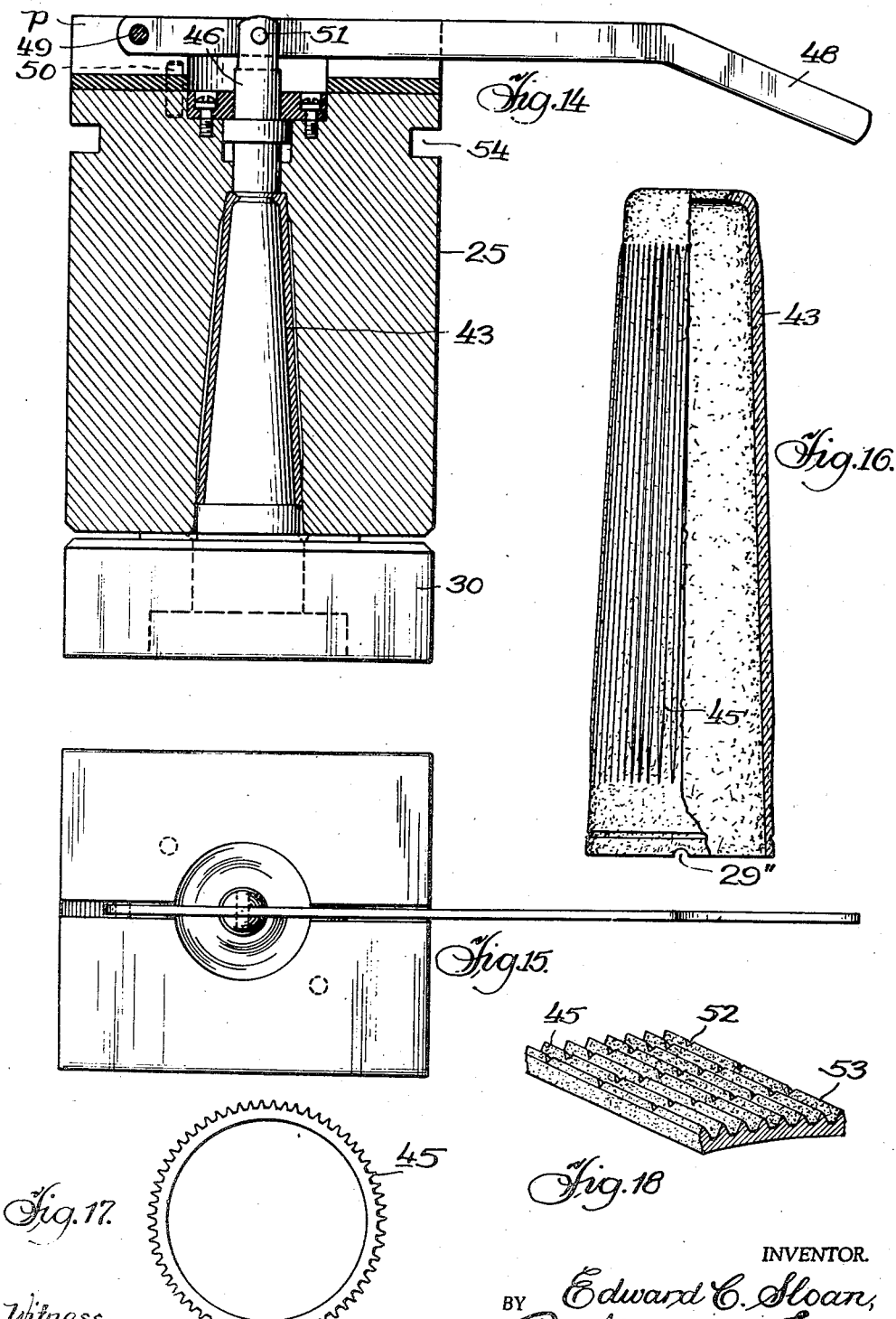

Patented Oct. 21, 1947

2,429,431

UNITED STATES PATENT OFFICE 2,429,431

TEXTILE CONE AND PROCESS OF MANUFACTURE

Edward C. Sloan, Geneva, Ill., assignor, by mesne assignments, to Jesse B. Hawley, Geneva, Ill.; Don M. Hawley and Emmett Donnelly, administrators of Jesse B. Hawley, deceased, assignors to Hawley Products Company, a corporation of Delaware Application June 19, 1941, Serial No. 398,721

7 Claims. (Cl. 92—55)

This invention relates to textile cones, and more particularly to fiber-reinforced plastic textile cones in which the article is formed by accreting in a bath resin-carrying fibers onto a porous former to produce a fibrous carcass of the desired and approximately final form and subjecting the same in a mold of similar shape to heat and pressure to cause the resin to become plastic and enclose the fibers, and then cure or set to form a fiber-reinforced plastic article possessing strength, pleasing appearance and high resistance to impact.

The standard practice in molding contoured plastic articles in which is desired a high resistance to impact has been to mix with a powdered or granular resin, fibers or groups of fibers such as short threads, and to place this loose and unformed material in the cavity of the mold and force the male die down into the cavity. The heat from the cavity and the male portion of the die softens the material so that the resin portion of the mixture becomes fluid and is forced by the pressure caused by the diminishing volume of space between the male die and the cavity up the sides of the mold to completely fill the clearance between the male and female dies.

In the practice followed prior to my invention, the mixture used to mold contoured articles of high resistance to impact or shock necessarily has to have a large proportion (by volume) of reinforcing fibers, threads or other reinforcing materials. This causes the bulk factor to be high, hence a proportionally long stroke both in time and distance is necessary between the first contact of the material with both the male and female dies and the final closed position of the mold. The resin must be heated by contact and must flow a considerable distance, carrying the reinforcing fiber or thread with it.

In such old practice the resin must of necessity be a slow curing resin so that it will not cure between the time of the first contact with the die and the time of its final closing, because only on its final closing does the die exert the proper pressure to form a properly cured, dense article and no part of the resin should be cured before it has been fused with particles of resin adjacent to it under proper pressure.

Among the objects of my invention is to eliminate the above objections and accomplish the advantages set forth above.

A further object is to form a textile cone by accreting in a fibrous bath a fibrous carcass of final form except for reduction in thickness by pressing, resin being added to the bath in which the accreting takes place, or being drawn through the interstices of the fibers of the carcass in a second bath after the accreting has been done in a first bath, in order to lessen the amount of resin required.

Another object is to impress under heat and pressure, the carcass thus formed to cause the resin to become plastic and fill the interstices of the carcass and surround the fibers so that when the textile cone is completed it will be a plastic article thoroughly reinforced by fibers accreted in final form, except for the lesser thickness of the wall due to pressing.

A still further object is to provide a fiber reinforced plastic textile cone formed under heat and pressure in which the heat and pressure from the die are applied to the resin almost simultaneously, enabling the use of a quick-setting resin, and in which the contoured accreted reinforcement holds the resin in almost its final position in relation to the closed molding die.

Another object is to lower the cost of material used in an article of the class described, since the resin is more expensive than the reinforcement and the proportion of resin to the reinforcement is much smaller in my present invention than in molding practices heretofore used.

A further object is to produce a textile cone in which the manufacturing cost is lower due to the fact that a quick curing resin can be used, and hence the time cycle of molding is much shorter than in the method heretofore practised.

A still further object is to produce a textile cone in which is it not necessary to flow the plastic material any substantial distance, but in which the resin is incorporated in the accreted carcass in almost its final position in relation to the closed molding die, and in which there is very little movement of the resin except for a limited movement in a direction from one side to the other through the thickness of the article wall, and at the same time have such article thoroughly reinforced by an accreted fibrous carcass of the final form except for its thickness, density and detail of surface.

Another object is to provide a textile cone which is light, has high resistance to impact and has walls of considerable extent compared to the wall thickness, and which can be definitely molded without tearing, rupturing or weakening the original reinforcing structure.

A still further object is to form a properly shaped plastic preform with fiber reinforcement and which can be made into the final plastic textile cone merely by sufficient heat and pressure.

Another object is to provide a contoured fibrous carcass for a textile cone having parallel or practically parallel walls which can be wet pressed by using an expandible female pressing form which will exert pressure at right angles to each surface of the male pressing form.

A still further object is the provision of means to provide a positive limit of pressure in plastic molding.

Another object is to provide a textile cone of the character described on which thread may be wound for use in textile machines, and in which the outer surface is provided with means to prevent the thread from slipping with relation to the cone.

Other objects, advantages and capabilities will later more fully appear.

My invention further resides in the combination, construction and arrangement of parts illustrated in the accompanying drawings, and while I have shown therein preferred embodiments I wish it understood that the same are susceptible of modification and change without departing from the spirit of my invention.

In the drawings—

Fig. 7 is a side elevation of a wire supporting form showing in cross section a textile cone thereon after being removed from the apparatus of Fig. 6.

Fig. 8 is a view partly in vertical section and partly in side elevation of a drying oven showing therein a plurality of textile cone carcasses mounted on the wire supporting frames of Fig. 7.

Fig. 9 is a vertical sectional view through a median plane of the male molding die.

Fig. 10 is a vertical sectional view through a median plane through both the male molding die and the female molding die, showing therein a textile cone embodying my invention after these two dies have been completely closed for completing the molding operation.

Fig. 11 is a top plan view of Fig. 10 looking from the line 11—11 in the direction of the arrows.

Fig. 12 is a diagrammatic perspective view showing the wire support for holding the dried carcass between the male and female molding dies just prior to these two dies being brought together.

Fig. 13 is a view looking toward the right-hand side of Fig. 12.

Fig. 14 is a more or less diagrammatic view of the male and female molding die, with the female molding die and textile cone shown in vertical section, and showing a knockout mechanism for knocking the finished textile cone from the female die after the male die has been removed from the female die and from the molded article.

Fig. 15 is a top plan view of Fig. 14.

Fig. 16 is a side view of a molded textile cone embodying my invention, and showing the left-hand half of the cone in side elevation and the right-hand half in vertical section on a median plane.

Fig. 17 is an enlarged horizontal transverse section through the textile cone shown in Fig. 16 and showing exaggerated a transverse cross section of the ribs on the exterior of the cone.

Fig. 18 is an enlarged fragmentary perspective view of a portion of the exterior of the textile cone of Fig. 16, and showing the transverse notches in the longitudinal ribs.

Referring in detail to the drawings, in which I have shown a textile cone on which thread is wound for use in textile machines, 1 designates a suitable tank for containing a bath 2 of water or other suitable liquid having fibers suspended therein, and in which bath is lowered a felting form 3 having perforations 4 for the passage of water therethrough, the exterior surface of the felting form being covered with a fine mesh wire screen 5 upon which are deposited by suction or other pressure differential the fibers from the bath 2.

A suitable resin, preferably a water soluble resin, is added to the bath 2 so that when the fibers are accreted onto the felting form 3 to form a carcass of desired shape and the water largely removed, the fibers will have coated thereon and to a certain extent impregnated therein resin so that in the later molding operation under heat and pressure the resin will become plastic, the thickness of the carcass decreased, the plastic resin cured when a thermosetting resin is used, or the plastic resin chilled or cooled when a thermoplastic resin is used, and a fiber reinforced plastic textile cone or spool result. A few of the resins that may be used in carrying out my invention will be referred to later herein.

Figure 1:
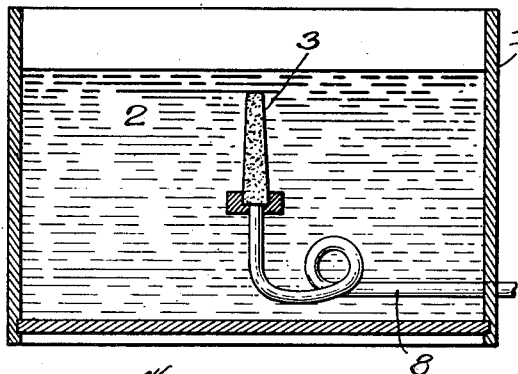
Fig. 1 is a vertical transverse section through a tank for containing a felting bath, and showing a felting former and suction hose in position therein.
Figure 2:
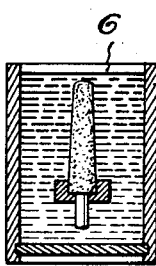
Fig. 2 shows a smaller accreting tank in which less resin will be required to produce the same result than in the tank shown in Fig. 1.
Figure 3:
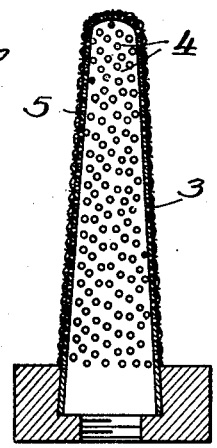
Fig. 3 is a vertical section on a median plane through one of the felting formers.

The resin to be molded may be deposited on and in the fibers while in the bath and during the accreting operation, or the resin may be combined with the fibers by replacing the water carried into the felted form by "pulling through" a solution carrying resin which replaces the water in the carcass, which carcass in this instance can have been accreted in a fiber bath not containing resin. When the resin is added by the "pulling through" operation, the resin will be omitted from the bath 2 in tank 1 and will be confined in a smaller bath 6 in a smaller tank 7 for purposes of economy. In the latter instance the carcass will be accreted onto the felting form 3 in the bath 2 (this bath not having resin added thereto), and after the carcass is thus accreted and removed from bath 2, some of the water being removed from the carcass by continuing the suction therethrough, the carcass will then be immersed in the bath 6 containing resin and the resin pulled or sucked through the carcass with the liquid in bath 6 to replace the water originally in the carcass from bath 2. By adding the resin to the bath 6, a lesser amount of resin is required than if added to the larger bath 2, thus enabling better control of the fibers and resin. In Fig. 1, the felting form 3 is shown prior to the deposit of the carcass thereon, the suction being supplied from any suitable source through the flexible hose 8, which will be of sufficient length and flexibility to permit the felting form to be lowered into and raised out of the bath.

When the fiber carcass has been accreted onto the felting form 3 in sufficient thickness, the fibers carrying resin from bath 2 or bath 6 as desired, the felting form 3 with its carcass 9 is inserted into the female wet pressing form 10 comprising a hollow shell 11 within which is secured an expandible bag 12 of rubber or other suitable flexible material. Bag 12 is provided at its lower end with an annular horizontal flange 13 secured in any desired manner to the flange 14 of the shell 11. One form of such fastening means may be a retention plate 17, between which and flange 14 the flange 13 of the rubber bag may be clamped. At the time the felting form and carcass are first inserted into the wet pressing form 10, the rubber bag or the like 12 will be extended against the inner wall of the pressing form by suction through opening 15, which may be led to any suitable source of vacuum.

Figures 4, 5, 6:
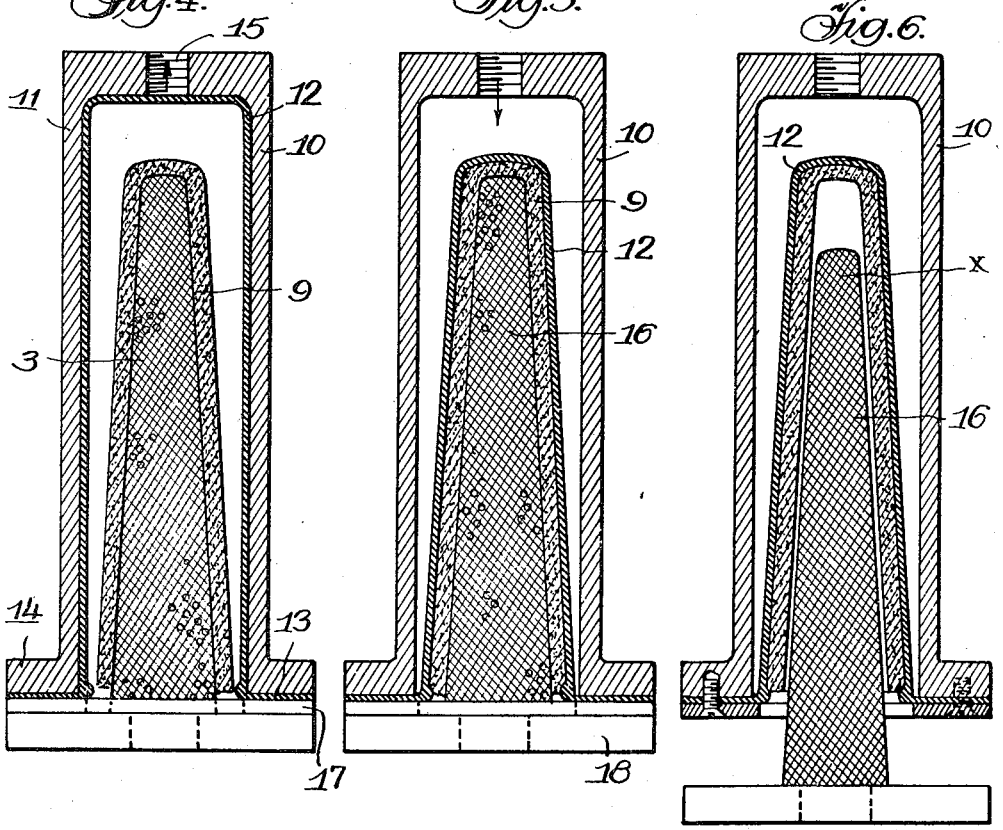
Fig. 4 is a vertical sectional view of a wet pressing form with the expandible bag extended and the felting form and wet carcass inserted therein.
Fig. 5 is a view similar to Fig. 4 but showing a pressing mandrel substituted for the felting form and with the expandible bag pressing against the wet carcass.
Fig. 6 is a view similar to Fig. 5 but showing the pressing mandrel partly withdrawn from the pressed carcass.

The suction through opening 15 is then discontinued, thus permitting the rubber bag 12 to return to its normal condition, which normal condition is such as to cause it to grip the carcass 9 with sufficient gripping action to retain the carcass in the rubber bag and permit the felting form to be removed therefrom, which removal may be facilitated by blowing air to any sufficient degree through the openings in the felting form 3. Fig. 5 shows the parts as thus described immediately after removal of the felting form from the carcass, and after the pressing form 10 has been transferred to and over a male pressing mandrel 16 which, as shown in Fig. 5, is inserted into the carcass. Any suitable fastening means may be used for securing the bottom flange 18 of the mandrel 16 in operative position with relation to the wet pressing form 10.

The pressing mandrel 16 is provided with drainage grooves, apertures or the like over which a porous screen x may be secured for permitting outlet of moisture from the carcass during the wet pressing operation. This wet pressing operation with the parts in position as shown in Fig. 5 is accomplished by admitting air pressure through opening 15 sufficient to compress the rubber bag 12 against the wet carcass 9 with any desired degree of pressure, for example, for from fifty to one hundred and fifty pounds per square inch. This pressure reduces the section thickness of the carcass about one-third to one-half, the carcass while wet and before being pressed being of any desired thickness, but when used in making textile cones a thickness of about one-fourth inch is preferred.

The fluid pressure (which may be air, water or other desired fluid) between bag 12 and shell 10 is then released to atmospheric pressure, and the wet pressing form and carcass are jointly removed from the pressing mandrel 16 as indicated in Fig. 6, and transferred to a supporting form such as the coiled wire form 19 shown in Fig. 7, the rubber bag being released from the wet pressed carcass by the application of a vacuum between the bag 12 and shell 10 to free the carcass and permit it to remain on the support 19.

The wet pressed carcasses thus formed are then introduced into any desirable form of heating oven (see Fig. 8), in which they are heated to any desired degree of dryness for molding under heat and pressure.

After drying, the carcasses 9 are introduced into the heated molding dies, but it is preferable that the interval of time between the introduction of the dried carcass into the molding dies and the application of pressure to the dies be as small as possible in order not to prematurely heat and render plastic and cure the resin in any portion of the carcass before the dies are completely closed and the final form is given to the article. I have shown in Figs. 12 and 13 means for effecting a nearly instantaneous introduction of the carcass into the molding dies and the closing of these dies thereover, which means comprises an upright rod or the like 20 on which is supported an outwardly extending wire arm 21 (formed of two laterally separable portions if desired), having at its outer end a pair of resilient fingers 22, 23 which are normally urged together a sufficient degree to grasp the carcass 9 and hold it immediately above the male molding die 24, so that when said fingers 22 and 23 are released the carcass will immediately fall directly over the male molding die. To effect this release of fingers 22 and 23 and and the instantaneous closing of the molding dies, these fingers are each curved outwardly to a point beyond the lower outer edge of the female molding die 25 (see Fig. 13). When the female molding die 25 descends by any suitable mechanism, its lower edges 26 contact the cam shaped curvature of fingers 22 and 23, moving them outwardly to clear the female die and permit the carcass to drop over the male molding die and be immediately followed up by the female molding die closing thereover. These molding dies are heated as will be later more fully explained, and any suitable means used for applying pressure to them. When the female molding die 25 is again raised, spring arms 22 and 23 move inwardly and in position to again receive a carcass for another molding operation.

The male molding die is shown in Fig. 9 and comprises the upstanding tapered portion 27 having a portion 28 at its upper end of reduced diameter to serve as a guide, and over which tapered portion is placed a preform (by preform is meant one of the carcasses treated as described above and dried), such preform at any stage of the operation having an opening formed in its upper closed portion, or such opening being formed during the accreting operation if desired. At the bottom end of the tapered portion 27 is mounted an insert 29 which is so positioned as to extend a sufficient distance 29' above the bottom line e of the carcass or preform, to form the notch 29" in the bottom edge of the finished cone, which notch seats over a suitable projection on the textile machine (not shown) to drive the cone during its operation. The upstanding tapered portion 27 is secured by any desired means in the base portion 30, which is provided with openings 31 and cross-communicating openings 32, through which steam, or other heating medium, may be passed for heating the base portion of the male die. The upstanding portion 27 of the male die may be heated by steam, hot water or other heating medium passed through any inlet connection into the opening 33, such heating medium passing through the opening 34, upwardly through the inner tube 35, out the upper end of same and downwardly through the space between tube 35 and the wall of the larger diameter opening 36, and thence through opening 37 and out through outlet 38. The male molding die will thus be heated to any desired temperature in the manner just described. Fixed in the base portion 30 and upstanding therefrom, are the guide pins 39 which fit into complementary registering holes in the female molding die 25 in order to bring the two molding dies into exact registry.

The female molding die 25 as shown in Fig. 10, comprises the body portion formed with intercommunicating openings 40 closed at their ends by plugs 41 or other suitable closing means. Intercommunicating openings 31, 32 in the male molding die are likewise closed by suitable plugs 42. The block of the female molding die is formed with a proper shaped cavity to define the finished article 43. Said cavity in the female molding die is also provided with longitudinally extending grooves 44 to form a plurality of more or less closely positioned longitudinal ribs 45 on the exterior of the finished article as seen in Figs. 16, 17 and 18.

Extending upwardly and concentrically with the cavity in the female molding die is an opening O for reciprocally receiving the tube 46 which centers the upstanding reduced end 28 of the male molding die, and the bottom edge of which tube is shaped to properly form the top edge of the textile cone as indicated at 47 in Fig. 10. In order to heat the female molding die, steam, hot water or other heating fluid will be introduced in any desired manner through the intercommunicating openings 40. Any suitable press for applying pressure to the molding dies will be used as desired.

After the molding operation has been completed, which in the form of the textile cone described herein can be done within a few seconds, and the mold separated, the longitudinally movable tube 46 will be moved downwardly to knock the cured cone from the female molding die. Means for enabling this knockout movement are shown in Fig. 14, and comprises a lever arm 48 fulcrumed at 49 to a plate p positioned by pin 50 to the upper side of the female molding die 25, lever 48 also being pivotally connected at 51 to the upper end of the longitudinally movable tube 46 so that upon a downward manual pull upon the end of lever 48 the finished textile cone 43 will be knocked out of the female molding die after the male molding die has been removed therefrom. This knockout movement is further required because of the presence of the ribs 45 on the cone.

After the finished cone 43 is removed from the female molding die it, by any suitable means, may be either provided with a plurality of series of transverse notches 52 or the ribs sandblasted or otherwise roughened as indicated at 53 to prevent slipping of the thread on the exterior of the cone during use of such cones in textile machines. The upper end of the female molding die 25 is provided with a circumferential notch 54 to receive fastening means for fastening the female molding die to the upper part of the press within which it is to be used. The base 30 of the male molding die may be placed upon the face of the bottom portion of the press and held in proper position by any suitable means to register with the female molding die.

As will be noted, the sides of the finished textile cone are so nearly parallel that without my present invention it would be practically impossible to wet press or otherwise press or mold the same without disrupting the material of the wet carcass to the damage of the finished product. In the present invention any such disrupting or damage is avoided by use of my expandible bag 12, which applies the wet pressing action in a suitable perpendicular direction with relation to the wet carcass, and by reason of expanding the rubber bag away from the wet carcass during insertion of the wet carcass into the wet pressing form there can be no rupture or other damage to the carcass.

Also, if desired, the textile cone described in connection with Figs. 1–18 may be made with either the male die or the female die formed of expandible material to enable plastic molding with vertical parallel walls of any desired thickness or thinness. This use of an expandible die in plastic molding will enable the use of a positive limit of pressure, instead of some points exceeding the limit of pressure.

In carrying out my invention. I have found that in molding the plastic articles referred to temperatures of from 275° F. to 400° F. and pressures of from 1000 to 3000 pounds per square inch may be used, excellent results having been obtained by using a pressure of approximately 2000 pounds per square inch. I have also successfully molded satisfactory fiber-reinforced plastic articles of the kind described in as low as fifteen seconds.

Some of the resins that may be used in carrying out my invention are synthetic resins, thermosetting resins such as phenol-formaldehyde, phenol-furfural and urea formaldehyde, thermoplastic resins and natural resins such as lignin, and the like, and others of a like nature not specifically enumerated, e. g., a dark colored, high melting thermoplastic material obtained from southern pine by solvent fractionation in the manufacture of wood rosin, which is preponderantly insoluble in gasoline and not completely soluble in aromatic hydrocarbons but soluble in alcohol.

When using thermoplastic resin the molding die or dies will be chilled after the article has been molded.

From the foregoing it will be seen that I have provided for the manufacture of thin-walled, fibrous reinforced molded plastic articles, in which the carcass of the article is initially accreted in a water-pulp fibrous bath into substantially final form, resin is incorporated therein, the original thickness of the carcass is materially reduced and a portion of the water removed, the carcass dried, and then molded under heat and pressure to render the resin plastic, cause it to flow into the interstices between the fibers and embed the fibers, the direction of flow of the plastic resin being in the direction of the wall thickness, the fiber reinforcement being uniformly present throughout the entire body of the finished molded article.

Having now described my invention, I claim:

1. The process of making fiber-reinforced plastic textile cones for holding thread in a textile machine, said cones having elongated approximately parallel side walls, which consists in accreting onto a porous former in a water-pulp substantially resin-free bath a fibrous carcass of substantially the same shape as the finished cone, removing the carcass from said bath and immersing it while still wet in a substantially fiber-free second bath of water and water-soluble resin, applying suction to the carcass in the second bath to remove water from the interstices between the fibers and fill said interstices with water and water-soluble resin from the second bath, wet-pressing the carcass to remove some of the liquid and at the same time lessen the wall thickness, drying the carcass, placing the dried carcass between separated heated dies and releasably suspending it there in coaxial alinement with the separated dies but out of contact with either of the dies, moving the dies toward each other and during such movement releasing the carcass from its holding means so that the carcass will fall into the cavity between the dies, and applying pressure to the dies substantially simultaneously with the contact of the carcass with the dies, so as to prevent prematurely heating the resin in the carcass prior to the application of pressure to the dies.

2. The process of making fiber-reinforced plastic textile cones for holding thread in a textile machine, said cones having elongated approximately parallel side walls, which consists in accreting onto a porous former in a substantially resin-free liquid-fiber bath a fibrous carcass of substantially the same shape as the finished cone, removing the carcass from said bath and immersing it while still wet in a second bath of liquid and resin, applying suction to the carcass in the second bath to remove liquid from the interstices between the fibers and fill said interstices with liquid and resin from the second bath, wet-pressing the carcass to remove some of the liquid and lessen the carcass wall thickness, drying the carcass, releasably suspending the dried carcass between separated heated dies in coaxial alinement therewith but out of contact with either of the dies, moving the dies relatively together and simultaneously releasing the carcass, and applying pressure to the dies at substantially the same time that the carcass contacts the dies.

3. The process of making fiber-reinforced plastic cones having elongated approximately parallel side walls for holding thread in a textile machine, which consists in forming an accreted fibrous carcass impregnated with resin, drying the carcass, releasably suspending the dried carcass between separated heated dies in coaxial alinement therewith but out of contact with either of the dies, moving the dies relatively together and simultaneously releasing the carcass to occupy the cavity between the dies, applying pressure to the dies at substantially the same time that the carcass contacts the dies, and continuing the pressure for a desired time.

4. The process of making fiber-reinforced plastic cones having elongated approximately parallel side walls for holding thread in a textile machine, which consists in forming a wet accreted fibrous carcass impregnated with resin, wet-pressing the carcass to remove part of the liquid and reduce the thickness of the walls, drying the carcass, releasably suspending the elongated carcass between separated heated dies but out of contact therewith, and substantially simultaneously closing the dies against the carcass and applying pressure thereto to melt the resin and cause it to flow around the fibers, the elongated approximately parallel side walls being unruptured during the application of pressure thereto.

5. A textile cone for holding thread in a textile machine, which comprises a fibrous body having plastic material intimately enclosing the fibers and filling the interstices between the fibers, the fiber-plastic body being dense and formed on its outer surface with a large number of longitudinally extending ribs positioned closely together with narrow valleys therebetween, said ribs each having inclined sides which converge to an apex and transverse notches in the outer edges thereof, the notches in each rib being longitudinally spaced apart substantial distances with the apical outer rib edge between each pair of adjacent notches being a straight line, whereby the ribs and notches form means for preventing slippage of thread on the cone during use of the cone and thread in the operation of a textile machine.

6. A textile cone for holding thread in a textile machine, which comprises a fibrous body having plastic material intimately enclosing the fibers and filling the interstices between the fibers, the fiber-plastic body being dense and formed on its outer surface with a large number of longitudinally extending ribs positioned closely together with narrow valleys therebetween, said ribs each having inclined sides which converge to an apex and transverse notches in the outer edges thereof, the notches in each rib being longitudinally spaced apart substantial distances with the apical outer rib edge between each pair of adjacent notches being a straight line, whereby the ribs and notches form means for preventing slippage of thread on the cone during use of the cone and thread in the operation of a textile machine, the fiber-plastic body being hollow and formed with thin walls the outer longitudinal surfaces of which are nearly parallel.

7. A textile cone for holding thread in a textile machine, comprising a plastic-fiber body in which the fibers are interlaced and uniformly present from end to end of the cone, resinous plastic material intimately surrounding the fibers and filling the interstices between the fibers, said body being hollow with thin walls the outer longitudinal surfaces of which are nearly parallel, a large number of longitudinally extending ribs integrally formed on the exterior of the cone and each having inclined sides which converge to an apex, said ribs being roughened for preventing slippage of thread on the cone, the plastic-fiber walls being dense and hard with the fibers reinforcing the plastic material substantially uniformly throughout the extent of the walls.

EDWARD C. SLOAN.

REFERENCES CITED

The following references are of record in the file of this patent:

UNITED STATES PATENTS

| Number | Name | Date |
|---|---|---|
| 1,368,217 | Young | Feb. 8, 1921 |
| 1,949,472 | Hopkinson | Mar. 6, 1934 |
| 2,195,240 | Chaplin | Mar. 26, 1940 |
| 2,183,869 | Randall et al. | Dec. 19, 1939 |
| 2,146,871 | Weiner et al. | Feb. 14, 1939 |
| 1,963,134 | Keiding | June 19, 1934 |
| 1,691,005 | Burke | Nov. 6, 1928 |
| 1,782,855 | Levin | Nov. 25, 1930 |
| 2,136,826 | Schur | Nov. 15, 1938 |
| 2,237,048 | Carter | Apr. 1, 1941 |
| 2,274,095 | Sawyer | Feb. 24, 1942 |
| 2,273,373 | Perry | Feb. 17, 1942 |
| 2,163,585 | Chaplin | June 27, 1939 |
| 2,115,496 | Maters | Apr. 26, 1938 |
| 2,163,618 | Muller | June 27, 1939 |
| 1,949,291 | Barthelmes | Feb. 27, 1934 |
| 2,319,267 | Sawyer | May 18, 1943 |
| 2,337,574 | Sloan et al. | Dec. 28, 1943 |
| 2,104,081 | Kenney | Jan. 4, 1938 |
| 2,296,744 | Simmons | Sept. 22, 1942 |
| 2,190,672 | Meharg | Feb. 20, 1940 |

FOREIGN PATENTS

| Number | Country | Date |
|---|---|---|
| 484,823 | Germany | Oct. 22, 1929 |
| 502,855 | Great Britain | Mar. 21, 1939 |